US012697827B2

(12) United States Patent
Chin et al.

(10) Patent No.: US 12,697,827 B2
(45) Date of Patent: Aug. 4, 2026

(54) PRINTER AND A MOVEABLE BLADE EQUIPPED WITH A CLOSING GUIDE

(71) Applicant: Toshiba Tec Kabushiki Kaisha, Tokyo (JP)

(72) Inventors: Ting Yee Chin, Singapore (SG); Kiyotaka Nihashi, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 173 days.

(21) Appl. No.: 18/642,781

(22) Filed: Apr. 22, 2024

(65) Prior Publication Data

US 2024/0375418 A1 Nov. 14, 2024

(30) Foreign Application Priority Data

May 12, 2023 (JP) ................................ 2023-079319

(51) Int. Cl.
*B41J 11/70* (2006.01)
*B41J 15/04* (2006.01)

(52) U.S. Cl.
CPC ............. *B41J 11/70* (2013.01); *B41J 15/046* (2013.01)

(58) Field of Classification Search
CPC ........ B41J 11/70; B41J 15/046; B41J 11/703; B41J 11/706; B41J 11/68; B41J 11/001; B41J 11/006; B41J 11/04
USPC .......................................................... 347/171
See application file for complete search history.

(56) References Cited

U.S. PATENT DOCUMENTS

2005/0232678 A1 10/2005 Mochizuki et al.
2021/0031543 A1* 2/2021 Shinoda .................. B41J 11/70

FOREIGN PATENT DOCUMENTS

JP 11301043 A * 11/1999
JP H11-301043 A 11/1999
JP 2011-136472 A 7/2011
JP 2012171728 A * 9/2012
JP 2020-066143 A 4/2020
JP 2023-064253 A 5/2023
KR 879969 B1 * 1/2009 ............. B41J 11/70

OTHER PUBLICATIONS

Nomura Akio, Cutter Device and Printer Provided with the Same Translated Specifcation, Sep. 10, 2012, (Year: 2012).*
Notice of Reasons for Refusal dated Oct. 20, 2025 issued in JP Application No. 2023-079319, with English translation, 8 pages.

* cited by examiner

*Primary Examiner* — Leslie J Thompson
*Assistant Examiner* — Samuel Frederick Boelitz
(74) *Attorney, Agent, or Firm* — FOLEY & LARDNER LLP

(57) ABSTRACT

A printer that forms an image on paper includes a movable blade configured to approach a fixed blade and cut the paper located between the movable blade and the fixed blade by at least the distal end of the movable blade running on the fixed blade, a housing including an opening, through which the movable blade can be inserted, and configured to house the movable blade, and a closing guide configured to close a gap between the opening and the movable blade and, if the distal end of the movable blade runs on the fixed blade, follow the running-on to thereby continue the closing.

10 Claims, 6 Drawing Sheets

PRINTER AND A MOVEABLE BLADE EQUIPPED WITH A CLOSING GUIDE

CROSS-REFERENCE TO RELATED APPLICATION

This application is based upon and claims the benefit of priority from Japanese Patent Application No. 2023-079319, filed on May 12, 2023, the entire contents of which are incorporated herein by reference.

FIELD

Embodiments described herein relate generally to a printer.

BACKGROUND

A printer that forms an image on continuous paper made of plain paper, heat sensitive paper, or the like conveys the continuous paper after the image formation until the continuous paper extends to a predetermined length. Thereafter, it cuts the continuous paper with a cutter device incorporated in the printer to segment the continuous paper into a desired shape. The cutter device includes a fixed blade and a movable blade. These blades are disposed to be separated from each other to allow the continuous paper to pass therebetween. The continuous paper can be cut by the movable blade moving toward the fixed blade with the continuous paper located therebetween.

The cutter device explained above is disposed such that a gap is defined between the cutter device and components such as a printer housing and a cover around the cutter device. Therefore, after the continuous paper is cut, the leading end of the cut paper sometimes extends or intrudes into the gap. If the movable blade moves to, for example, return to an original position thereof in a state in which the leading end of the paper intrudes into the gap, a paper jam is likely to occur because, for example, the paper is caught inside the cutter device.

DETAILED DESCRIPTION

Figure 1:
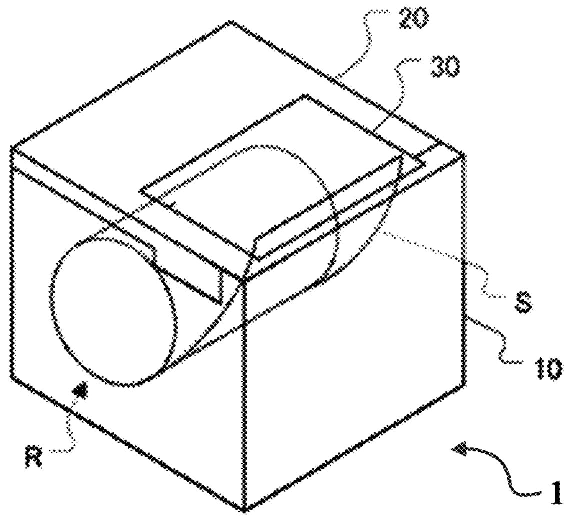
FIG. 1 is a schematic perspective view illustrating a printer according to at least one embodiment that houses roll paper.

An object of embodiments is to provide a technique capable of reducing paper jams.

According to at least one embodiment, a printer is provided that forms an image on paper, the printer including: a movable blade configured to approach a fixed blade and cut the paper located between the movable blade and the fixed blade by at least a distal end of the movable blade running on the fixed blade; a housing section including an opening, through which the movable blade can be inserted, and configured to house the movable blade; and a closing guide configured to close a gap between the opening section and the movable blade and, if the distal end of the movable blade runs on the fixed blade, follow the running-on to thereby continue the closing.

An embodiment is explained below with reference to the drawings. In the drawings, the same components are denoted by the same reference numerals and signs.

(Configuration of a Printer)

Figure 2:
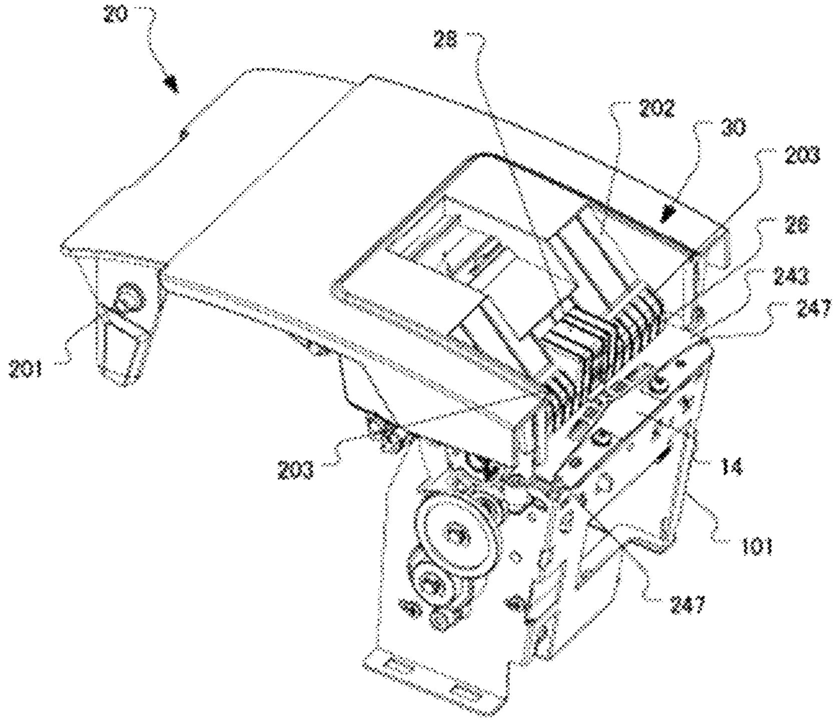
FIG. 2 is a perspective view illustrating a cover of the printer.
Figure 3:
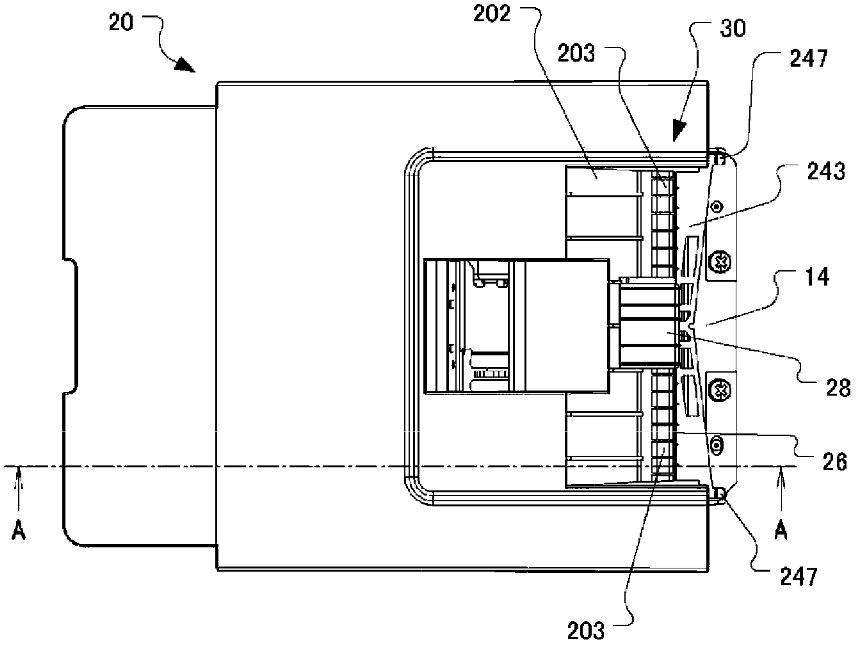
FIG. 3 is a plan view illustrating the cover.
Figure 4:
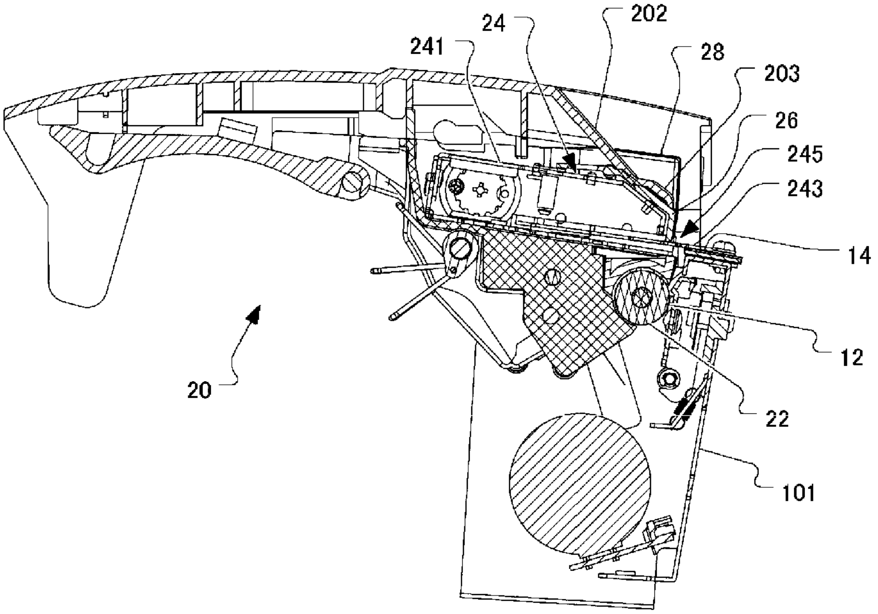
FIG. 4 is a sectional view taken along an A-A line illustrated in FIG. 3.

A configuration of a printer according to at least one embodiment is described. FIG. 1 is a schematic perspective view illustrating the printer according to at least one embodiment that houses roll paper. FIGS. 2 and 3 are a perspective view and a plan view illustrating a cover of the printer according to this embodiment. FIG. 4 is a sectional view taken along an A-A line illustrated in FIG. 3.

A printer 1 according to at least one embodiment illustrated in FIGS. 1 to 4 is configured as a thermal printer that performs printing with a direct thermal recording printing scheme using continuous paper (paper) S that is direct coloring paper such as heat sensitive paper. The printer 1 includes a housing 10 that houses roll paper R formed by the continuous paper S being wound in a roll shape and a cover 20 provided to be openable and closable with respect to the housing 10. A discharge port 30 for discharging the continuous paper S after being cut is formed on the upper surface of the printer 1. Note that, in the following explanation, the right oblique downward side in the figure of the printer 1 illustrated in FIG. 1 is referred to as front of the printer 1 and the opposite side of the right oblique downward side is referred to as rear.

The housing 10 is formed in a substantially box shape that defines a housing space for housing the roll paper R. The front side of the housing 10 further projects upward compared with the rear side of the housing 10. The projecting portion forms a part of the upper surface of the printer 1.

The cover 20 is formed to be capable of covering the rear side upper surface of the housing 10. A pair of spindles 201 illustrated in FIG. 2 provided at one end portion of the cover 20 is axially supported to be capable of turning in the housing 10. The cover 20 turns with the pair of spindles 201 as an axis to thereby open and close the housing space of the housing 10 to be openable and closable.

The discharge port 30 is formed across the upper surface of the housing 10 and the front surface of the cover 20. Specifically, the discharge port 30 is formed by a cutout portion formed on the rear side of the upper surface of the housing 10 and a cutout portion formed on the front side of the upper surface of the cover 20. The discharge port 30 recesses downward to be formed as a recess. A fixed blade 14 and a cutter unit 24 explained in detail below are provided in the discharge port 30. The continuous paper S is cut by the fixed blade 14 and the cutter unit 24, whereby a user can acquire the cut continuous paper S from the discharge port 30.

As illustrated in FIGS. 2 and 4, in the housing 10, a frame 101 formed in a substantially C shape in plan view is provided such that the rear side of the frame 101 is opened. A printing head 12 is attached to an upper part of the frame 101, that is, near the discharge port 30. The printing head 12 includes a plurality of heat generating elements adjacent to each other in the width direction (the left-right direction) of the continuous paper S. The printing head 12 forms an image on the continuous paper S by the plurality of heat generating elements generating heat according to an input pulse wave.

The upper surface of the frame 101 forms a part of the bottom surface of the discharge port 30 explained above. The fixed blade 14 that cuts the continuous paper S in cooperation with a movable blade 243 of the cutter unit 24 explained below is attached to the upper surface of the frame 101 using fasteners such as screws. The fixed blade 14 is a plate-like member extending in the left-right direction. The rear end portion of the fixed blade 14 is formed as an edge portion that cuts the continuous paper S between the rear end portion and the movable blade 243.

In the cover 20, as illustrated in FIG. 2, an inclined surface 202 inclining downward toward the front in the discharge port 30 is formed. At the front side distal end of the inclined surface 202, two guide covers 203 curved to rise upward from a slope are formed to be separated from each other in the left-right direction. Details about the guide covers 203 are explained below. As illustrated in FIG. 4, below the inclined surface 202 and the guide covers 203, a platen roller 22 and the cutter unit 24 are provided to be fixed to the cover 20.

The platen roller 22 is a roller rotatably axially supported in the cover 20 in a position facing the printing head 12 to compress the continuous paper S against the printing head 12 from the rear surface side. The platen roller 22 is driven to rotate by a rotating device such as a motor to thereby convey the continuous paper S unwound from the roll paper R to be discharged from the discharge port 30.

The cutter unit 24 is provided to be located above the platen roller 22, in other words, on the downstream side in a conveying direction of the continuous paper S. The cutter unit 24 includes a substantially box-like housing 241 long in the left-right direction. The movable blade 243 is provided in the housing 241. The movable blade 243 is a plate-like member extending in the left-right direction. The distal end portion of the movable blade 243 is formed as an edge portion that cuts the continuous paper S between the distal end portion and the fixed blade 14. The movable blade 243 is configured to advance and retract in the front-rear direction by a not-illustrated driving device such as a solenoid. The driving device is controlled to be driven by a control device incorporated in the printer 1. The movable blade 243 is installed on the bottom surface of the housing 241 in a state in which the movable blade 243 is inserted through an opening 245 extending in the left-right direction formed in a lower part of a front side wall section in the housing 241.

The opening 245 is formed to have a predetermined length in the up-down direction such that a gap is defined between the opening 245 and the movable blade 243, specifically, above the movable blade 243. The fixed blade 14 is arranged to face the front of the opening 245. In the following description, the gap is referred to as opening gap. The movable blade 243 inserted through the opening 245 advances toward the fixed blade 14 and retracts. The movable blade 243 comes into contact with the fixed blade 14 to thereby cut the continuous paper S interposed between the movable blade 243 and the fixed blade 14. Note that, in FIGS. 2 to 4, the cutter unit 24 is in a cutting state in which a part of the movable blade 243 runs on the fixed blade 14 and is positioned in the most advanced position.

Both ends 247 in the left-right direction at the front side end portion of the movable blade 243 are bent at an acute angle (for example, 45°) upward as illustrated in FIG. 2. As illustrated in FIG. 3, the movable blade 243 is formed in a shape recessed to the inner side toward the left-right direction center from both the ends 247. That is, both the ends 247 project further to the fixed blade 14 side than the left-right direction center portion.

As illustrated in FIGS. 2 to 4, a closing guide 26 for closing the opening 245 is disposed between the cutter unit 24 and the guide covers 203. The closing guide 26 is a plate-like member having flexibility that extends in the left-right direction and is bent in a substantially L shape in side view to come into contact with the front side upper surface and the front surface of the housing 241 and cover these surfaces. The closing guide 26 is preferably configured as, for example, a molded product manufactured by resin molding. Besides, the closing guide 26 may be configured by an elastic body such as rubber. A material and a manufacturing method do not matter if the closing guide 26 has flexibility and is capable of closing the opening 245.

The closing guide 26 closes the opening 245, while leaving a moving path of the movable blade 243, by the distal end, that is, the front side lower end portion of the closing guide 26 being always in contact with the upper surface of the movable blade 243. Specifically, the closing guide 26 comes into contact with the upper surface of the movable blade 243 to close the opening gap defined by the edge portion in the opening 245 and the upper surface of the movable blade 243. The closing guide 26 comes into contact with each of the upper surface of the housing 241 and the lower surfaces of the guide covers 203 such that the rear side of the closing guide 26 is held between the upper surface of the housing 241 and the lower surfaces of the guide covers 203. The front side of the closing guide 26 is separated from the distal ends of the guide covers 203 in a standby state (see FIG. 6) in which the movable blade 243 does not advance. On the other hand, the front side of the closing guide 26 comes into contact with the distal ends of the guide covers 203 in a cutting state as described below.

The closing guide 26 is formed integrally with a sensor cover 28 disposed in substantially the center in the left-right direction of the closing guide 26. The sensor cover 28 is formed in a box shape for housing, on the inside of the sensor cover 28, a not-illustrated paper sensor that detects presence or absence of the continuous paper S. The bottom surface of the sensor cover 28 is integral with the closing guide 26. An opening for the paper sensor is formed on the front surface of the sensor cover 28 to extend in the up-down direction. The sensor cover 28 is fixed to the cover 20 on the rear side of the sensor cover 28. Therefore, the closing guide 26 is fixed to the cover 20 via the sensor cover 28.

Before being cut by the fixed blade 14 and the cutter unit 24, the continuous paper S is conveyed into the discharge port 30 to a certain degree. Therefore, a plurality of protrusions extending in the up-down direction and projecting forward are consecutively connected on at least a front side wall surface in each of the closing guide 26 and the sensor cover 28. For example, if the roll paper R is roll paper of a liner-less type, a contact area of an adhesive layer applied or provided on the rear surface of the continuous paper S and the closing guide 26 can be reduced by the plurality of protrusions.

(Operation of the Cutter Unit 24)

Figure 5:
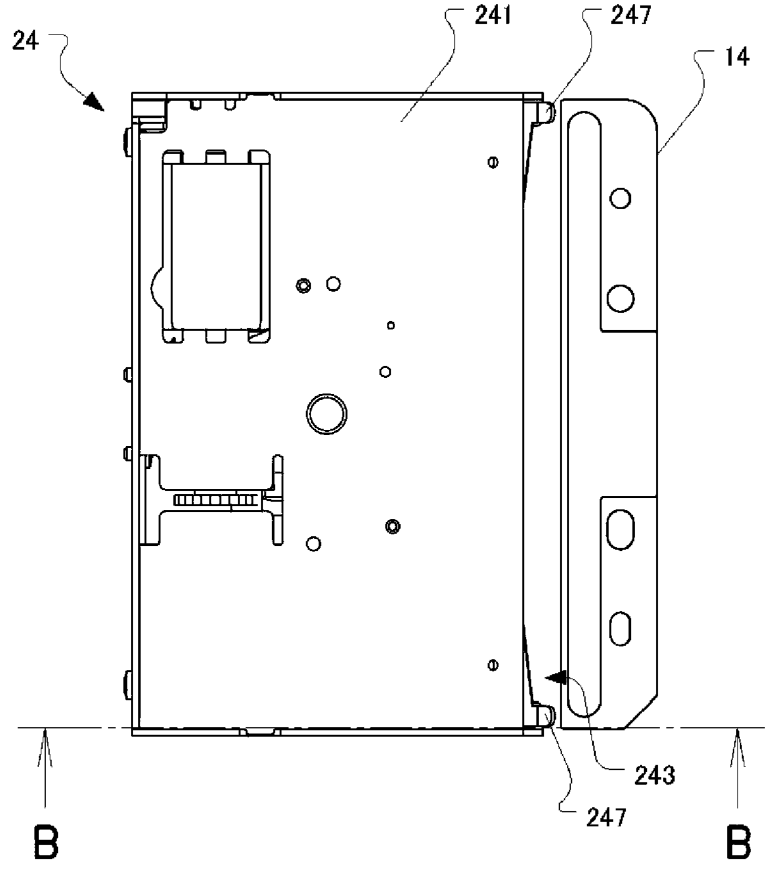
FIG. 5 is a plan view illustrating a cutter unit in which a movable blade is in a standby state.
Figure 6:
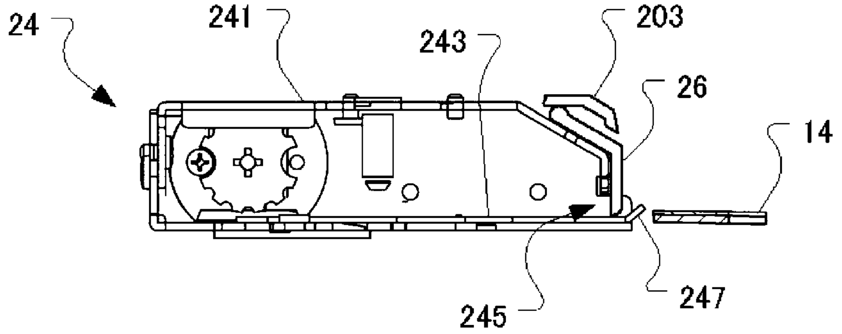
FIG. 6 is a sectional view taken along a B-B line illustrated in FIG. 5.
Figure 7:
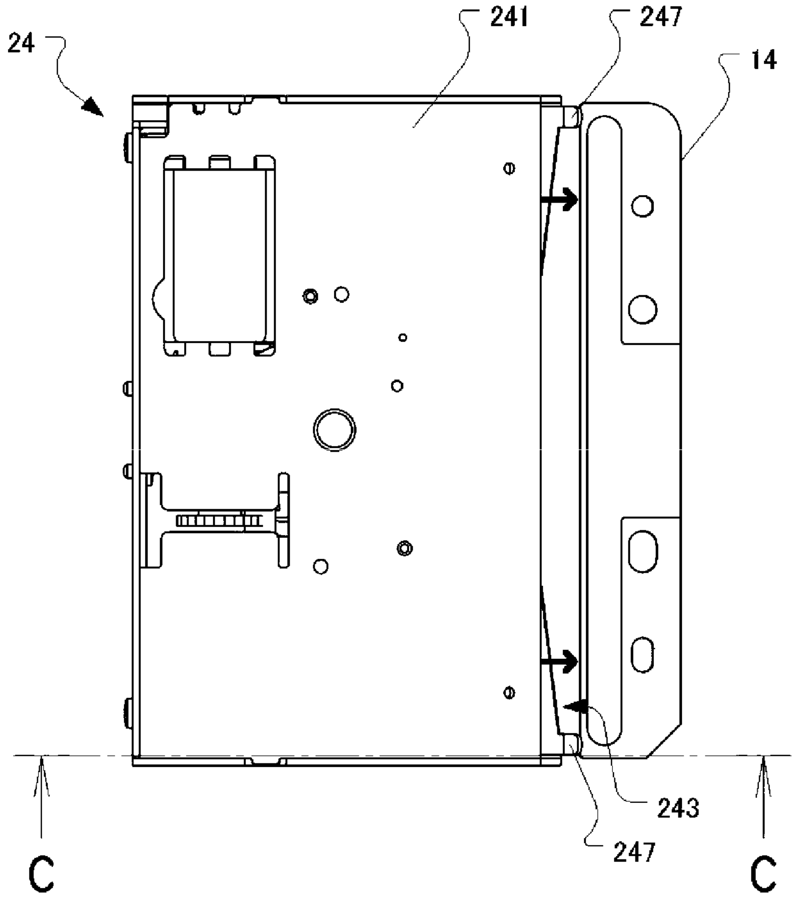
FIG. 7 is a plan view illustrating the cutter unit in which the movable blade advances to be in contact with a fixed blade.
Figure 8:
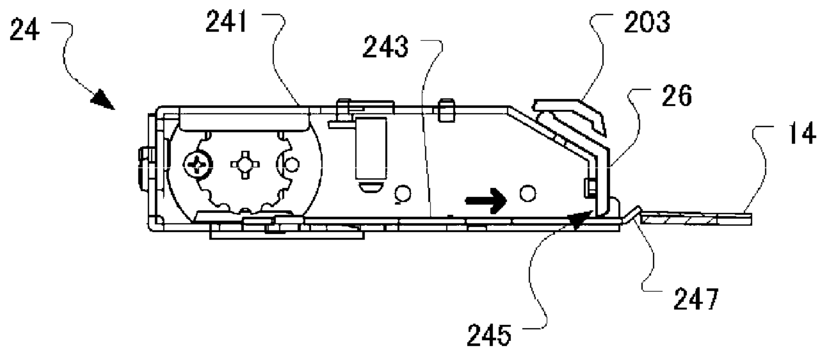
FIG. 8 is a sectional view taken along a C-C line illustrated in FIG. 7.
Figure 9:
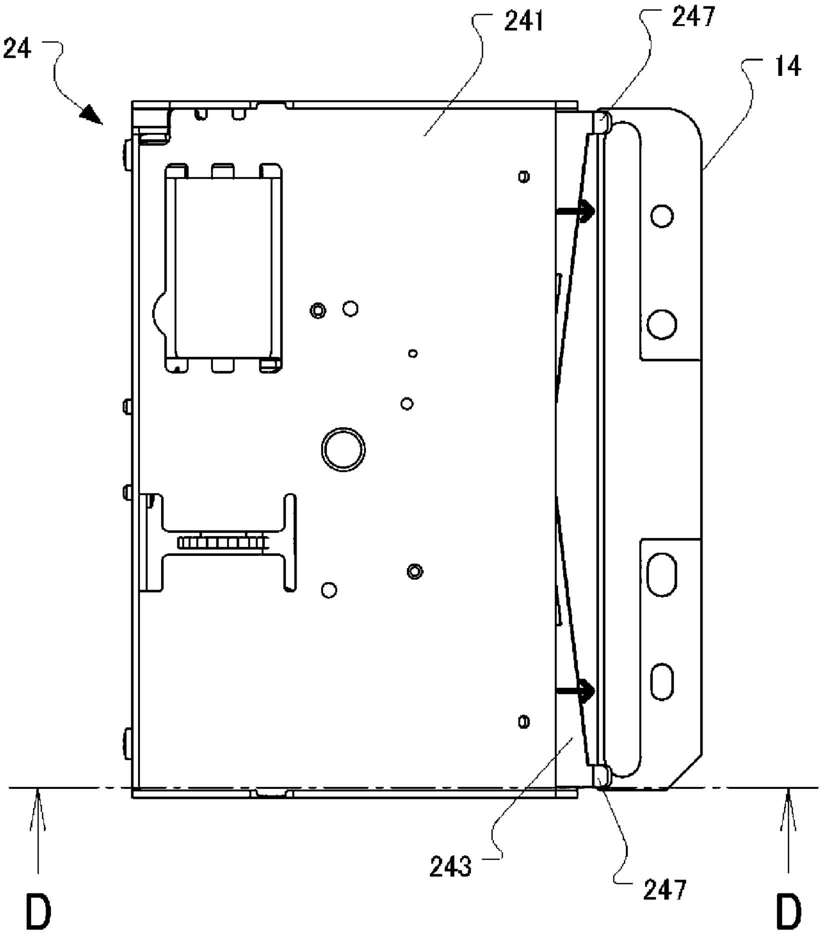
FIG. 9 is a plan view illustrating the cutter unit in which the movable blade further advances and starts to run on the fixed blade.
Figure 10:
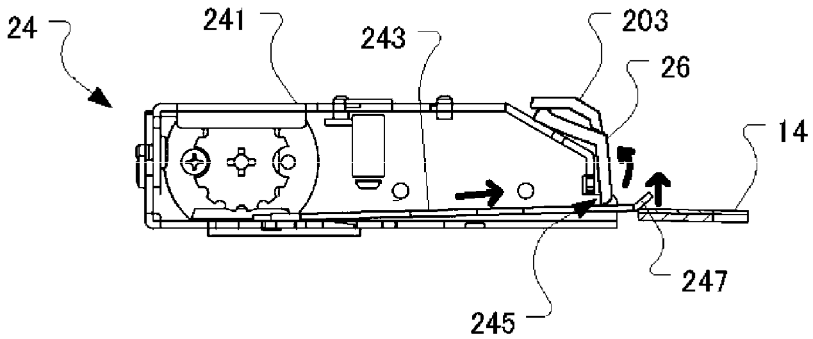
FIG. 10 is a sectional view taken along a D-D line illustrated in FIG. 9.
Figure 11:
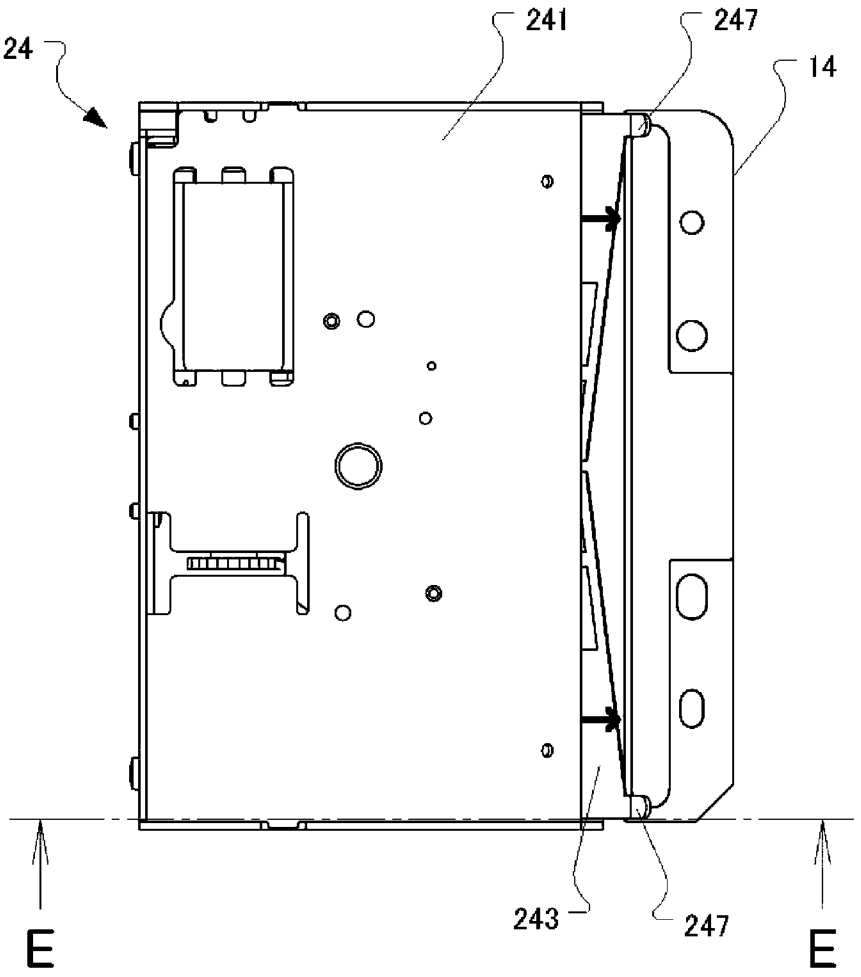
FIG. 11 is a plan view illustrating the cutter unit in which the movable blade further advances and further runs on the fixed blade.
Figure 12:
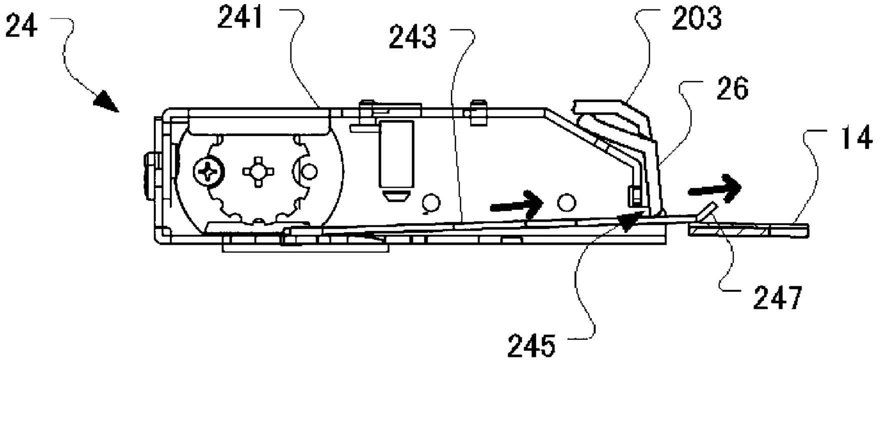
FIG. 12 is a sectional view taken along an E-E line illustrated in FIG. 11.

Next, operations of the cutter unit 24 and the closing guide 26 according to this embodiment are explained. FIG. 5 is a plan view illustrating the cutter unit in which the movable blade is in a standby state. FIG. 6 is a sectional view taken along a B-B line illustrated in FIG. 5. FIG. 7 is a plan view illustrating the cutter unit in which the movable blade advances to be in contact with the fixed blade. FIG. 8 is a sectional view taken along a C-C line illustrated in FIG. 7. FIG. 9 is a plan view illustrating the cutter unit in which the movable blade further advances and starts to run on the fixed blade. FIG. 10 is a sectional view taken along a D-D line illustrated in FIG. 9. FIG. 11 is a plan view illustrating the cutter unit in which the movable blade further advances and further runs on the fixed blade. FIG. 12 is a sectional view taken along an E-E line illustrated in FIG. 11.

As illustrated in FIGS. 5 and 6, if the cutter unit 24 is in the standby state, the vicinities of both the ends 247 of the movable blade 243 project from the opening 245 to the outside of the housing 241. That is, both the ends 247 of the movable blade 243 are exposed in the discharge port 30. At this time, as explained above, the opening gap between the opening 245 and the movable blade 243 formed above the movable blade 243 is closed by the closing guide 26. The closing guide 26 is separated from the distal ends of the guide covers 203 such that gaps are defined between the closing guide 26 and the distal ends of the guide covers 203. In the following explanation, the gaps are referred to as guide gaps.

Note that, for example, at the time of power-off and immediately after power-on, if an image is formed on the continuous paper S, the printer 1 comes into a standby state, for example, if the continuous paper S is discharged after the image formation. In the standby state, the continuous paper S is interposed between the movable blade 243 and the fixed blade 14. For example, referring to setting of the roll paper R in the printer 1 as an example, first, the roll paper R is set in the housing space of the housing 10 in a state in which the continuous paper S is unwound to a certain degree. After the setting, the cover 20 is closed such that the unwound continuous paper S is held between the platen roller 22 and the printing head 12. Consequently, the continuous paper S is interposed between the movable blade 243 of the cutter unit 24 and the fixed blade 14.

After the roll paper R is set or after the continuous paper S is conveyed into the discharge port 30 by a predetermined amount after printing, the movable blade 243 is caused to advance as illustrated in FIGS. 7 and 8. By advancing, the movable blade 243 approaches the fixed blade 14. Even at the advancing time, the closing of the opening gap by the closing guide 26 is continued. If the advance is continued, first, both the ends 247 of the movable blade 243 come into contact with the fixed blade 14.

After the contact, as illustrated in FIGS. 9 and 10, if the movable blade 243 further advances, both the ends 247 run on the fixed blade 14 in a form in which the fixed blade 14 slides on the lower surfaces of the inclined both ends 247. At this time, the continuous paper S starts to be cut by the movable blade 243 and the fixed blade 14 from both ends of the width direction of the continuous paper S.

If running on the fixed blade 14, both the ends 247 of the movable blade 243 move upward by the thickness of the fixed blade 14. Therefore, the movable blade 243 is inclined to rise upward toward the front in the front-rear direction. Such upward movement of the movable blade 243 is allowed by the opening gap being defined above the movable blade 243 as described above. Therefore, the up-down direction length of the opening gap is preferably equal to or larger than an upward moving distance of the movable blade 243 due to the movable blade 243 running on the fixed blade 14.

If the movable blade 243 moves upward, the closing guide 26, the distal end of which comes into contact with the movable blade 243, is urged in the same direction as the moving direction of the movable blade 243. Since the closing guide 26 has flexibility as explained above, the closing guide 26 is displaced to bend according to the movement of the movable blade 243. According to the displacement, the distal end of the closing guide 26 moves upward with a locus of the distal end drawing an arc. Such displacement of the closing guide 26 can allow the upward movement of the movable blade 243 while maintaining the state in which the opening gap is closed.

The displacement of the closing guide 26 is allowed because the guide gaps are defined between the closing guide 26 and the guide covers 203 as described above. The up-down direction length of the guide gaps is preferably equal to or larger than a moving (displacement) distance in the upward direction of the closing guide 26. In particular, it is suitable to set the up-down direction length of the guide gaps to be the same as the moving distance because the guide gaps can be completely closed. Because the guide gaps can be closed, it is possible to prevent intrusion of the continuous paper S into not only the opening gap but also the guide gaps. Note that, even if the guide gaps are set to be equal to or smaller than the moving distance, since the closing guide 26 has flexibility, the movement in the upward direction of the distal end of the closing guide 26 and the movable blade 243 is not hindered. However, in that case, a heavy load is applied to the closing guide 26.

After running on the fixed blade 14, as illustrated in FIGS. 11 and 12, if the movable blade 243 further advances, rear portions of both the ends 247 also move on the fixed blade 14. At this time, the state in which the movable blade 243 runs on the fixed blade 14 and the closing of the opening gap by the closing guide 26 are maintained. According to the advance of the movable blade 243, the continuous paper S is cut by the movable blade 243 and the fixed blade 14 from both ends of the width direction to the center of the continuous paper S.

If the movable blade 243 further advances, the movable blade 243 reaches a most advanced position illustrated in FIGS. 2 to 4. If the movable blade 243 reaches the most advanced position, the cutter unit 24 comes into a cutting state in which that cutter unit 24 completes the cutting in the width direction of the continuous paper S. After cutting the continuous paper S, the movable blade 243 retracts until coming into the standby state. According to the retraction, the urging to the closing guide 26 is released and the closing guide 26 returns to an original state thereof. At the time of such a shift from the cutting state to the standby state as well, the closing of the opening gap by the closing guide 26 is maintained.

According to at least one embodiment described above, it is possible to maintain the closed state of the opening gap by causing the closing guide 26 to follow the movement of the movable blade 243. In particular, since the roll paper R is formed by the continuous paper S being wound, curl that occurs in the continuous paper S intensifies as the continuous paper S is used for a longer time. Therefore, in a state in which the opening gap is not closed, the cut continuous paper S bends in the direction of the opening gap at a high probability and changes to a state in which the continuous paper S is inserted into the opening gap. If the movable blade 243 is retracted in this state, a paper jam due to the cut continuous paper S occurs. On the other hand, according to at least one embodiment, since the closed state of the opening gap can be maintained, it is possible to surely prevent a paper jam caused because the cut continuous paper S is caught in the opening gap.

Since the closing guide 26 has flexibility, the closing guide 26 is elastically deformed to rise if the movable blade 243 runs on the fixed blade 14. Therefore, a heavy load is not applied to the movable blade 243 and the advance of the movable blade 243 is not hindered.

Note that, in at least one embodiment, the printer 1 is explained as performing printing with the direct thermal recording printing scheme. However, the printer 1 may perform printing with another scheme. The roll paper R does not need to be heat sensitive paper. The continuous paper S may be, for example, a label sheet on which a plurality of labels are continuously stuck at intervals or may be continuous paper having a liner. That is, the continuous paper S only has to be sheet-like continuous paper.

The sensor cover 28 formed integrally with the closing guide 26 may be swingable in the up-down direction by, for example, being axially supported in the cover 20. In this case, the closing guide 26 may not have flexibility. This is because the closing guide 26 and the sensor cover 28 can integrally swing upward according to the upward movement of the movable blade 243.

Similarly, if the upward movement of the closing guide 26 involved in the upward movement of the movable blade 243 is possible, the closing guide 26 may not have flexibility. For example, a separation distance between the closing guide 26 and the guide covers 203 are sufficiently provided, the upward movement of the closing guide 26 involved in the upward movement of the movable blade 243 is allowed.

The closing guide 26 and the sensor cover 28 may be configured as separate bodies. In this case, the closing guide 26 is preferably axially supported or locked between the cutter unit 24 and the cover 20 not to drop from the guide gaps. Besides, a part of the closing guide 26 may be imparted with flexibility by, for example, only the distal end of the closing guide 26 being configured by an elastic body using two-color molding or the like.

The closing guide 26 is explained as being the plate-like member formed in the substantially L shape in side view but is not limited to this. For example, instead of the closing guide 26, two or more bar-like members extending in the up-down direction are disposed between the cutter unit 24 and the guide covers 203 to be separated from one another in the left-right direction. If the distal end portions of the two bar-like members are configured to come into contact with the movable blade 243 and to be connected to each other at the rear end portions thereof, the opening gap can be closed not in a surface but in a line and intrusion of the continuous paper S can be prevented.

The closing guide 26 is described as coming into contact with the upper surface of the movable blade 243 but may be brought close to the upper surface of the movable blade 243 without coming into contact therewith. In this case, if most of the opening gap can be closed, it is possible to reduce intrusion of the continuous paper S into the opening gap and reduce a paper jam.

At least one embodiment is described above. However, the embodiments are present as examples and are not intended to limit the scope of the disclosure. New embodiments can be implemented in other various forms. Various omissions, substitutions, and changes can be made without departing from the gist of the disclosure. The embodiments and modifications thereof are included in the scope and the gist of the disclosure and included in the scope of the disclosure described in the claims and equivalents of the disclosure.

What is claimed is:

1. A printer configured to form an image on paper, the printer comprising:

a movable blade configured to move towards a fixed blade and cut the paper at a location between the movable blade and the fixed blade by at least a distal end of the movable blade running on the fixed blade;

a housing section including an opening, the movable blade arranged to be inserted in the opening, the housing section configured to house the movable blade; and a closing guide configured to close a gap formed between an end of the opening and the movable blade and, when the distal end of the movable blade runs on the fixed blade, follow the running-on of the distal end of the movable blade to thereby maintain the closing of the gap, wherein the closing guide is disposed in a space between the housing section and a guide cover that covers the closing guide, a gap is disposed between the closing guide and a distal end of the guide cover, and an up-down direction length of the gap is substantially the same as an upward moving distance of the closing guide based on the running-on of the distal end of the movable blade on the fixed blade.

2. The printer according to claim 1, wherein the closing guide is configured to close the gap by a distal end of the closing guide coming into contact with a surface of the movable blade.

3. The printer according to claim 1, wherein, when the distal end of the movable blade runs on the fixed blade, at least a part of the closing guide is displaced to follow the running-on and maintain the closing.

4. The printer according to claim 3, wherein the closing guide has structure configured to flexibly follow the running-on when the distal end of the movable blade runs on the fixed blade.

5. The printer according to claim 1, wherein the printer is a thermal printer.

6. The printer according to claim 1, further comprising a discharge port configured to discharge the paper after the paper is cut.

7. The printer according to claim 1, wherein the fixed blade is a plate member.

8. The printer according to claim 1, wherein the movable blade is a plate member.

9. The printer according to claim 1, wherein the closing guide is a plate member.

10. The printer according to claim 9, wherein the closing guide has a substantially L shape in side view.

* * * * *